Figure 1:
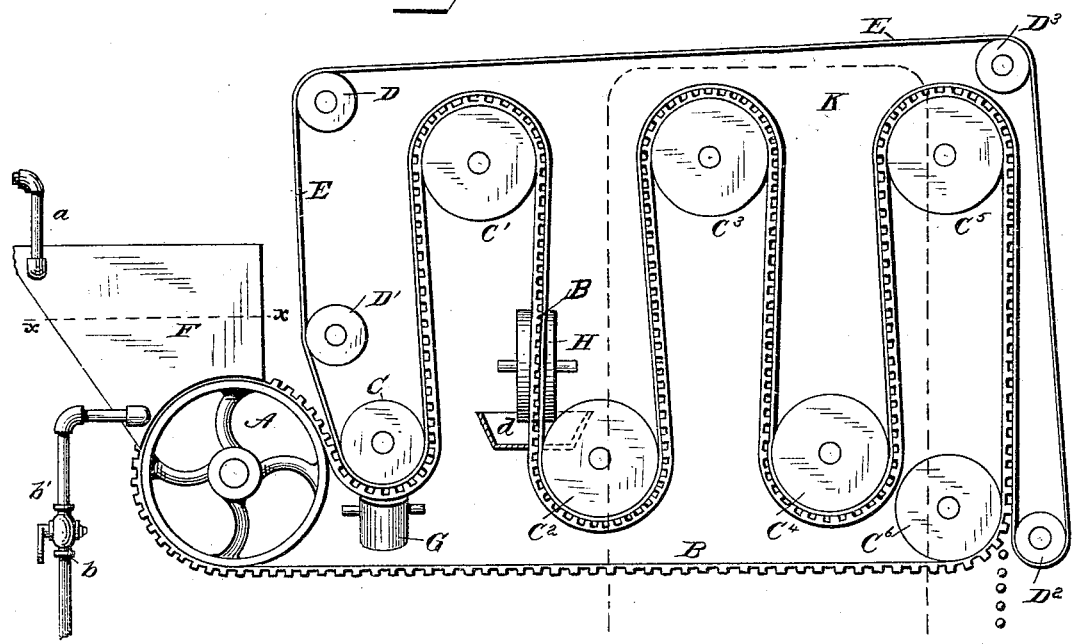

(No Model.)

C. J. DONNELLY.
MATCH MACHINE.

No. 270,403. Patented Jan. 9, 1883.

Witnesses:
F. L. Ourand
Philip Martin

Inventor:
Charles J. Donnelly
by W. T. Howard
atty.

UNITED STATES PATENT OFFICE.

CHARLES J. DONNELLY, OF PHILADELPHIA, PENNSYLVANIA.

MATCH-MACHINE.

SPECIFICATION forming part of Letters Patent No. 270,403, dated January 9, 1883.

Application filed September 6, 1882. (No model.)

*To all whom it may concern:*

Be it known that I, CHARLES J. DONNELLY, of the city and county of Philadelphia, and State of Pennsylvania, have invented certain Improvements in Match-Machines, of which the following is a specification; and I do hereby declare that in the same is contained a full, clear, and exact description of my said invention, reference being had to the accompanying drawings, and to letters of reference marked thereon.

In the preferred form of this invention the match-splints, of sufficient length to form two matches when centrally severed, are placed in a hopper, either after or before the treatment of their ends with sulphur, and are picked up singly and removed therefrom through the medium of an endless moving belt, having a corrugated or transversely fluted or grooved surface, the corrugations, flutes, or grooves being spaced in parallel order at suitable and preferably equal distances apart. The splints, after having been removed from the hopper by means of the grooved belt, if their ends have not already been sulphured, are carried by the belt to sulphur-pans, each end of each splint being thereupon immersed in sulphur, the splints being thence conveyed by the grooved belt to dipping-wheels or devices applying the composition, and thence in a lengthy circuitous course to a point where the face of the fluted belt is inverted, the splints being thereupon severed by a cutting device and discharged from the grooves of the belt, where they may fall into a hopper and be passed into packing-boxes. The grooved belt is used in connection with an endless tape which traverses the same pulleys over which the belt revolves and an independent series of pulleys, the tape bearing against the grooved or fluted face of the belt and holding the match-splints therein. Instead of the tape, guides may be fixed to maintain the match-splints in position on the belt in a manner hereinafter described. The hopper into which the splints are placed, and from which they are picked up by the grooved or fluted belt, is provided with a jacket at each side, to which steam may be admitted for heating the ends of the splints to a temperature approximating to that of the sulphur, in order that a better and smoother union of the sulphur and the splint may be effected, as will be understood by those familiar with the art.

In a modification of the invention the grooved or fluted belt is unwound from a reel, passes through the hopper, picks up the splints, and is wound upon a reel, the splints being inclosed within the coil of belt. The tape is unwound from a separate reel and wound up with the coil of belt. The reel on which the belt is coiled is made detachable, so that the projecting ends of the splints may be dipped together. In this form of the machine the sticks may be cut after removal from the coil, or the splints may be of a length only sufficient for one match and the belt made narrow.

Figures 2, 3:
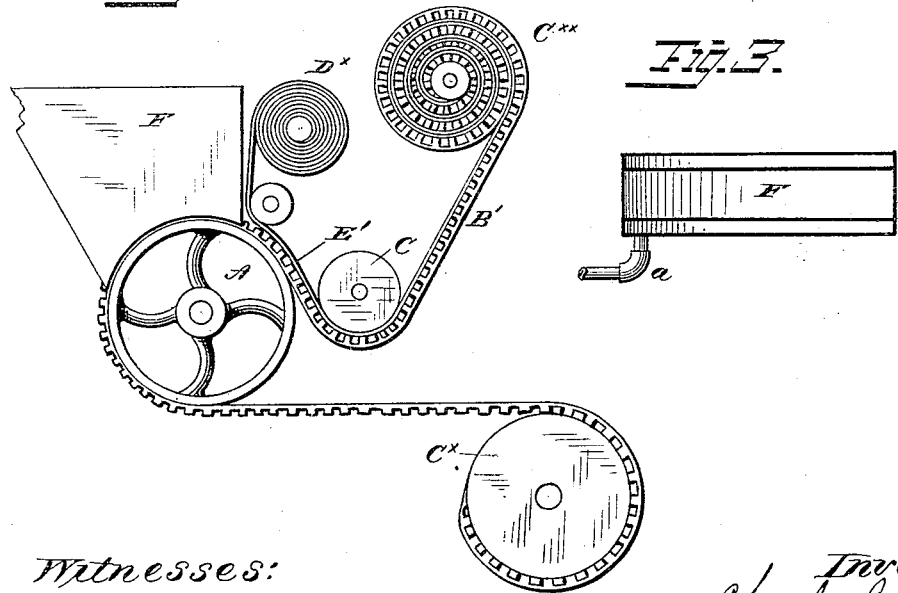

In the accompanying drawings, Figure 1 is a longitudinal elevation, partly in section, showing the essential features of the invention in its preferred form. Fig. 2 is a similar view, showing the modified form of the machine. Fig. 3 is a sectional plan of the hopper on the line $x\,x$ of Fig. 1.

Similar letters of reference indicate corresponding parts.

The frame of the machine may be of any suitable construction, and is not here shown.

A is a drum or pulley suitably driven by gearing.

B is an endless belt, preferably made of rubber or some elastic material, which passes over the pulley A and the series of pulleys $C\,C'\,C^2\,C^3\,C^4\,C^5\,C^6$, which pulleys may be variously arranged, so as to give the belt either a vertical up and down travel or otherwise.

$D\,D'\,D^2\,D^3$ are pulleys over which the tape E passes, it also passing under the pulley C and around the pulleys $C'\,C^2\,C^3\,C^4\,C^5$ simultaneously with the grooved or fluted belt B. The belt B and the tape E are of a width somewhat less than the length of the splint which forms two matches, so that each end of the splint when held by the belt will project beyond it.

F is the hopper, which, as shown specially in Fig. 3, has close-jacketed ends, into which steam is admitted through the pipe $a$, Fig. 1.

A drip or waste pipe is represented by $b$, provided with a cock, $b'$, through which pipe water of condensation may be removed from the steam-chambers of the hopper. Within the hopper is placed a wheel driven by gearing for distributing the matches and pressing them into the grooves of the belt. The wheel, not forming a part of my present invention, is not shown.

G represents a sulphur-pan, which I do not here fully describe, as it will form the subject-matter of a future application. A sulphur-pan is placed at each side of the belt.

It will be understood that if the splints are sulphured before being placed in the hopper it will be unnecessary to use the steam for heating the hopper, and also that the sulphur-pans will not be called into requisition.

H are dipping-drums located partially within trays $d$, containing the composition, and are driven by suitable gearing. A dipping-drum and tray are placed at each side of the belt, so as to apply the composition to each end of the splint.

The drums operate in substantially the same manner as the corresponding mechanism works in the match-machine patented to me under No. 203,125, April 30, 1878, and to them, in themselves, I here make no claim, and refer to my said former patent for any further explanation of their mode of action.

The operation of the machine, as shown in Fig. 1, will be easily understood. If the splints have not been sulphured preparatory to being placed in the hopper, steam is applied to the hopper, and the belt B having been put in motion, the splints are picked up by the grooved or fluted belt B and held by the tape E and carried to the sulphur-pans, thence to the dipping-wheels, and onward in a circuitous course until dried, when they are discharged from the belt beyond the pulley $D^2$, where they are cut and dropped into a receiving-hopper leading direct to the match-box, in which they are packed.

The belt B, in order to give proper time for drying the matches, may be made from one hundred to four hundred feet in length, and the splint from the moment it is picked up by the belt to that of its discharge therefrom may be upon the belt from ten to fifteen minutes.

The belt B may be doubled to take up two series of matches, in which case the hopper would be doubled or partitioned.

Instead of the tape E, guides or vertical strips may be fixed so as to confront the grooved or fluted surface of the belt B and hold the splints therein.

The operation of the modification of the invention shown in Fig. 2 will be understood from the foregoing. The belt $B'$ unwinds from the drum $C^*$, passing around the geared drum A under the pulley C, and around the reel $C^{**}$. The tape $E'$ unwinds from the reel $D^*$, passes under the pulley C, and winds up with the belt $B'$ on the reel $C^{}$. As before stated, the reel $C^{}$, after the belt and match-splints have been coiled thereon, is removed from its shaft and the ends of the splints dipped. The splints are cut after removal from the belt, or single splints may be used, in which case cutting is not necessary. The splints may, however, be treated with sulphur, and dipped as they are coiled, and also cut.

To facilitate the drying of the matches, the grooved or fluted belt, or a portion thereof, may be passed through a hot-air chamber, K. Fans for forcing hot air to the belt may also be used.

This invention is applicable equally to the manufacture of common or parlor matches. In the manufacture of the latter, the paraffine, wax, or other substance is applied instead of the sulphur, but by the same mechanical means.

While the grooved or fluted belt is preferably made of molded rubber, which gives the elasticity requisite to keep it tight, it is obvious that its substantial equivalent is found in a sectional or jointed wooden or metallic belt, having the necessary flutes or grooves.

I make no claim in this patent to a rubber belt having a corrugated, fluted, or grooved face homogeneous therewith, as such belt is applicable to other industries, and may form the subject of a separate application for Letters Patent; but

I claim as my invention—

1. In a match-machine, a belt having corrugations, grooves, or flutes to receive and hold match-splints, combined with a series of drums over or upon which the belt revolves or travels, and means for holding the splints to the belt and for imparting rotary motion to said series of drums, substantially as set forth.

2. In a match-machine, an elastic belt having corrugations, grooves, or flutes whereby the matches are distributed singly on the belt, the mechanism for imparting rotary motion thereto, combined with a hot-air chamber, through which the belt is caused to pass, to facilitate the drying of the matches by exposing them separately to the action of the belt, substantially as set forth.

3. In a match-machine, an elastic belt having corrugations, grooves, or flutes, combined with a tape and mechanism for imparting motion to said belt and tape, substantially as set forth.

4. In a match-machine, an elastic belt having grooves or flutes, a tape, and mechanism for imparting motion to said belt and tape, combined with a hopper, substantially as set forth.

5. In a match-machine, an elastic belt having grooves or flutes, and devices, as described, for holding the matches separately distributed in the grooves or flutes of the belt, combined with dipping devices, substantially as set forth.

6. In a match-machine, a steam-heated hopper, combined with an elastic corrugated belt, for receiving and conveying the match-splints from the hopper, substantially as set forth.

In testimony whereof I have hereunto set my hand and affixed my seal this 24th day of August, 1882.

CHARLES J. DONNELLY. [L. S.]

Witnesses:
 EDW. J. TIEL,
 JOHN SPARHAWK, Jr.